US006359552B1

(12) United States Patent
King

(10) Patent No.: US 6,359,552 B1
(45) **Date of Patent: *Mar. 19, 2002**

(54) FAST BRAKING WARNING SYSTEM

(75) Inventor: Joseph D. King, Ann Arbor, MI (US)

(73) Assignee: UT Automotive Dearborn, INC, Dearborn, MI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/099,084

(22) Filed: Jun. 17, 1998

(51) Int. Cl.[7] .................................................. B60Q 1/00

(52) U.S. Cl. ....................... 340/436; 340/901; 340/902; 340/903; 340/463; 340/467; 340/479; 180/167

(58) Field of Search ................................ 340/436, 902, 340/903, 463, 467, 479, 435, 901, 905; 180/167

(56) References Cited

U.S. PATENT DOCUMENTS

| | | | | |
|---|---|---|---|---|
| 3,854,438 A | * 12/1974 | Soto | ......................... | 116/28 R |
| 5,091,726 A | * 2/1992 | Shyu | .......................... | 340/904 |
| 5,162,794 A | * 11/1992 | Seith | .......................... | 340/903 |
| 5,302,956 A | 4/1994 | Asbury et al. | ................ | 342/70 |
| 5,357,438 A | * 10/1994 | Davidian | .................... | 340/436 |
| 5,424,726 A | * 6/1995 | Beymer | ...................... | 340/902 |
| 5,684,474 A | 11/1997 | Gilon et al. | ................ | 340/903 |

FOREIGN PATENT DOCUMENTS

| | | |
|---|---|---|
| EP | 0441576 | 8/1991 |
| FR | 2 655 755 | * 12/1989 |
| FR | 2 655 755 | 6/1991 |
| FR | 2655755 | * 6/1991 |
| FR | 2 752 635 | 2/1998 |

OTHER PUBLICATIONS

International Search Report Dated Oct. 26, 1999, in International Application No. PCT/US99/13601.

European Patent Office, Abstracts of Japan, Publication No. 08030885 Dated Feb, 2, 1996.

* cited by examiner

*Primary Examiner*—Julie Lieu
(74) *Attorney, Agent, or Firm*—Niro, Scavone, Haller & Niro

(57) ABSTRACT

A collision warning system warns vehicles traveling behind a vehicle when it initiates deceleration. A receiver on trailing vehicles receives the signal. A transmitter then transmits a signal in response to either the acceleration sensor or the receiver. A brake warning device is also automatically actuated upon reception of the signal, and the signal is retransmitted to the rear of a trailing vehicle. A warning provided in this manner allows operators several vehicles in back of the lead vehicle to be simultaneously notified that the lead vehicle is decelerating, independently of whether the intervening vehicles have manually applied their brakes.

6 Claims, 2 Drawing Sheets

FAST BRAKING WARNING SYSTEM

BACKGROUND OF THE INVENTION

The present invention generally relates to a collision avoidance system, and more particularly to a system that retransmits a brake warning throughout a line of braking vehicles.

Current interest in collision avoidance systems for automotive applications is rapidly increasing. This interest is due in part to the many safety benefits that a collision avoidance system provides. Many types of collision avoidance systems have been conceptualized. Several types include blind spot obstacle detection, collision detection, and backup alert warnings. These types of commonly known systems tend to be self contained "immediate area" warning systems. That is, such systems tend to provide a warning to an individual operator only in the event an obstruction is detected in the immediate perimeter of the equipped vehicle.

However, rear-end collisions tend to be the dominate type of accidents and "immediate area" warning systems fail to deter such collisions. In many cases, "pilups" of three or more vehicles may occur. Further, as most rear-end collisions occur on high speed multi-lane roadways there is a greater likelihood of extensive damage to a multiple of vehicles.

FIG. 1A shows one collision scenario. The lead vehicle 9 initiates a sudden deceleration from a high rate of speed. Due to the tendency for drivers to travel closely together, the result is a multi vehicle accident as depicted in FIG. 1B. As illustrated in FIG. 1B, some vehicles 11 make contact with other vehicles while staying in the current lane, and other vehicles 13 swerve into adjacent lanes in an effort to avoid contact thereby spreading the accident to traffic in adjacent lanes.

These sudden decelerations are often the cumulative result of "brake tapping" by each driver in a long line of vehicles traveling closely spaced together. Each brake tap results in the slowing of a vehicle. The following vehicle, closely spaced, observes the slowdown, takes time to react, and then also decelerates. The combined result of reaction time and slightly increased brake application along the line of vehicles causes the distance between vehicles to rapidly close. This results in a sudden stoppage or dramatic slowdown throughout the entire line of vehicles.

Known collision avoidance systems may send a signal from a slowing vehicle to the second vehicle. However, the second vehicle does not then send the signal on.

SUMMARY OF THE INVENTION

The present invention provides a collision warning system which simultaneously warns a multitude of vehicles traveling behind a vehicle initiating a sudden deceleration. The system includes a sensor for measuring vehicle deceleration, a receiver to receive a transmitted signal, and a transmitter which directionally transmits a signal in response to either the acceleration sensor or receiver. Preferably, a brake warning device is automatically actuated upon reception of the signal, and the signal is then retransmitted.

The transmitter is preferably located to transmit the signal to the rear of a vehicle and the receiver is preferably located in the front of the vehicle to receive the warning signal transmitted by a leading vehicle. Additionally, a repeater assembly automatically retransmits the warning signal received via the receiver out the rear of the vehicle through the transmitter.

The system preferably has at least two modes of warning operation, initiate warn and repeat warn. In the first mode, a vehicle initiating a sudden deceleration detects its own slowdown and transmits a warning to the rear of the vehicle. The second mode of operation does not detect deceleration but receives a transmitted warning from the vehicle(s) ahead and automatically actuates the vehicle brake lights. The warning is also simultaneously retransmitting to the rear to actuate the brake lights of the next vehicle. The present invention therefor provides an immediate warning to trailing vehicles following a lead vehicle which suddenly decelerates. A warning provided in this manner allows operators several vehicles in back of the lead vehicle to be simultaneously notified that the lead vehicle is decelerating independently of whether the intervening vehicles have manually applied their brakes. By this invention a multi-vehicle accident as illustrated in FIG. 1B is less likely to occur.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1A:
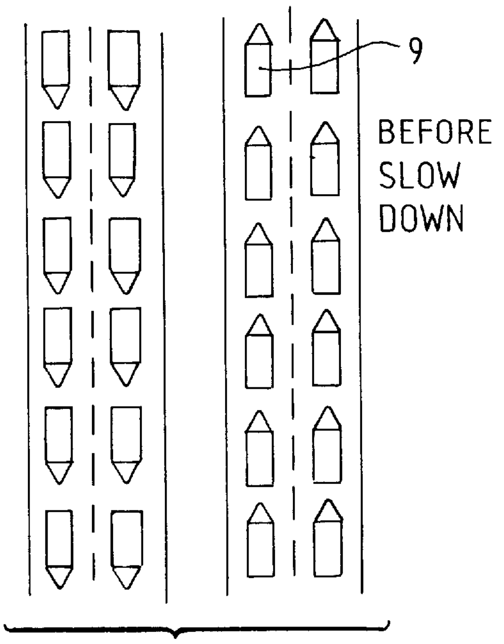
FIG. 1A is a simplified pictorial illustration of a divided highway on which a plurality of closely spaced vehicles are traveling.
Figure 1B:
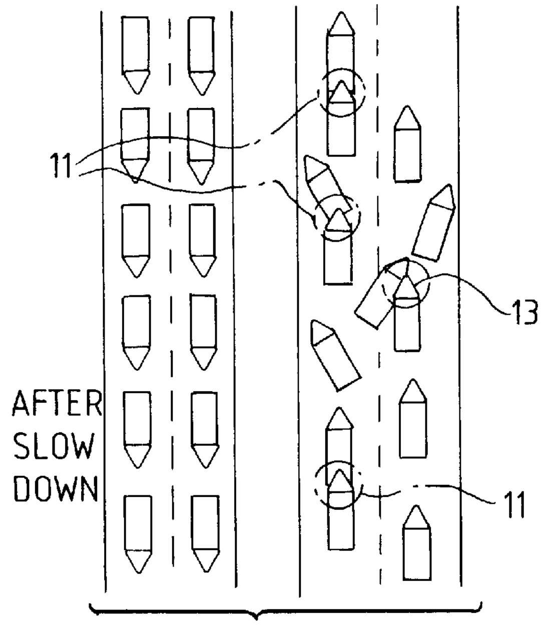
FIG. 1B is a simplified pictorial illustration of a multi-vehicle collision on the divided highway.
Figure 2:
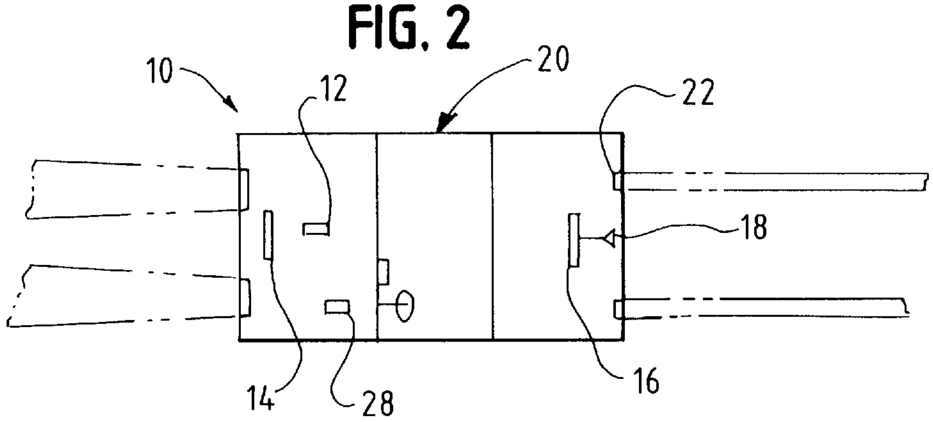
FIG. 2 is an enlarged perspective view of a vehicle equipped with the collision avoidance system of the present invention.

A collision avoidance system 10 for a vehicle 20 which warns of brake actuation is generally shown in FIG. 2. The system 10 includes an acceleration sensor 12, a receiver 14 for receiving a first signal, and a transmitter 16 for transmitting a second signal in response to the acceleration sensor 12 and/or the receiver 14.

The acceleration sensor 12, such as an accelerometer, provides the system 10 with the capability to determine the deceleration of vehicle 20. However, vehicle 20 deceleration may be determined in any conventional manner including brake application, vehicle speed, brake light actuation, or the like. It should also be recognized that speed sensing systems (e.g. Doppler-based), and/or distance measuring systems (e.g. pulse type radar); and the like, may also be used to measure vehicle 20, deceleration. The type of system to measure vehicle deceleration is transparent to the spirit of the invention described herein.

The transmitter 16 communicates with the acceleration sensor 12 and transmits a signal in response to the deceleration of the vehicle 20. The transmitter 16 transmits a signal via an antenna system 18 appropriate to the technology of the transmitter 16 and may transmit in any known manner, such as RF, IR, or microwave. The transmitter 16 preferably transmits through a specified distance and in a specific direction only. Preferably, the signal direction is contained by transmitting a well collimated beam having a narrow width and the transmission distance may be manually set by an operator, or fixed to a certain distance during installation. In this way, the signal is not likely to be received by vehicles in oncoming directions or in adjacent lanes. Commonly known methods of proper transmitter frequency selection, power level, and antenna design are available to contain the signal to a desired distance and direction. Preferably, the transmitter 16 is generally located on a rear portion of the vehicle 20.

The receiver 14 is operative to detect a signal from an external source such as a corresponding transmitter 16 from another vehicle. The receiver 14 and transmitter 16 may operate on any equivalent frequency and a frequency range of 76–77 GHz is the FCC approved range for collision avoidance devices. Preferably, the receiver 14 is generally located on a front portion of the vehicle 20 and actuates a brake warning device 22 in response to the reception of a signal from a transmitter 16.

The brake warning device 22 may be any commonly known system such as the brake lights of the vehicle 20. The brake warning device 22 is actuated when the receiver 14 detects a signal or when the acceleration sensor 12 determines that the vehicle 20 is decelerating. The repeater 28 and transmitter 16 preferably retransmits the signal detected by the receiver 14 irrespective of whether the brakes of the vehicle 20 are being applied.

Figure 3:
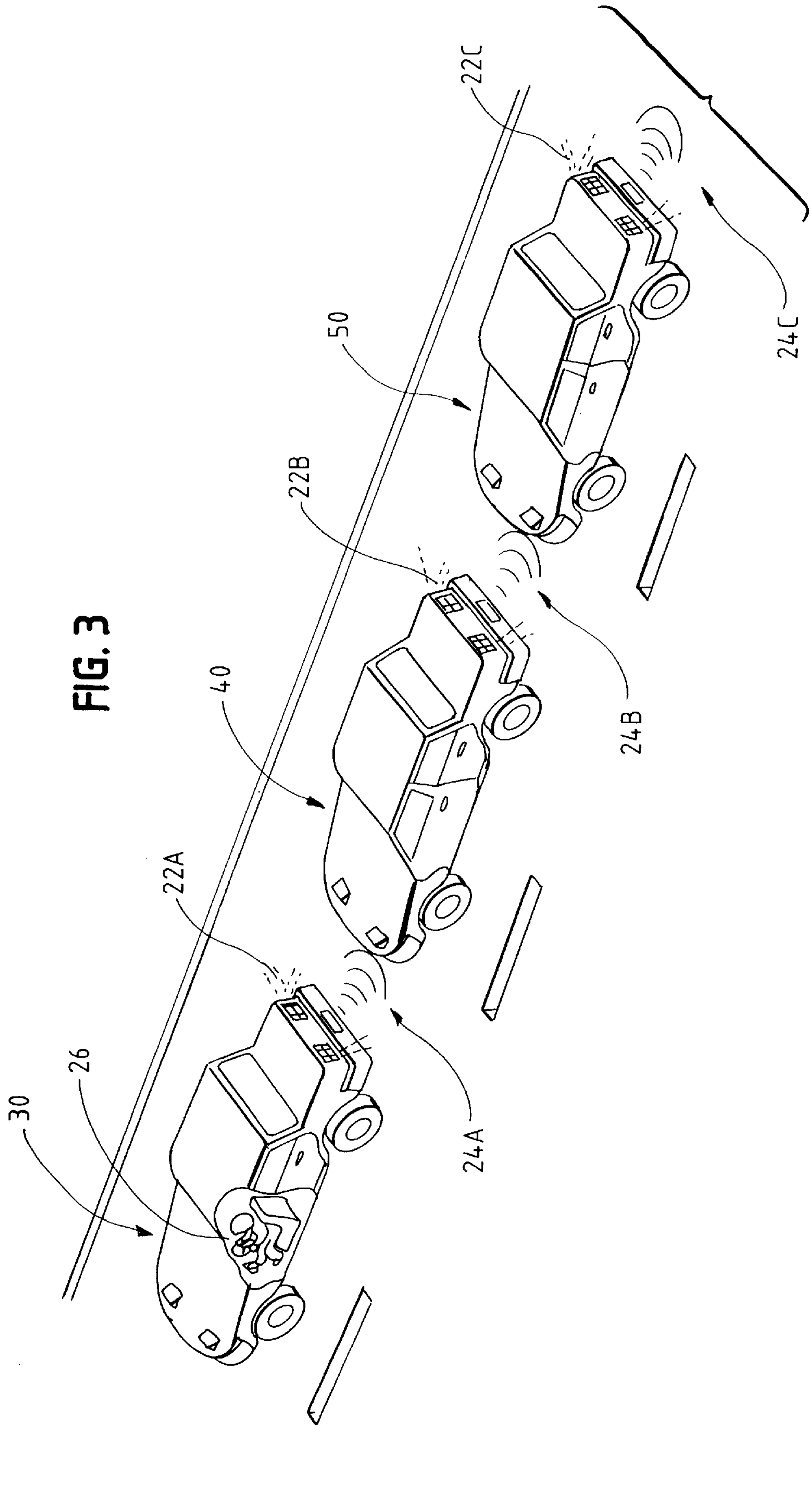
FIG. 3 is a pictorial illustration of a plurality of vehicles equipped with the present invention during a possible collision situation.

Reference is now made to FIG. 3 which illustrates the present invention during a possible collision situation. In operation, the collision avoidance system 10 (FIG. 2) preferably provides at least two modes of warning operation, initiate warn, and repeat warn. In the initiate warn mode, a leading vehicle 30 equipped with the present invention initiates a sudden deceleration by brake application. The brake lights 22A of the leading vehicle 30 are illuminated due to the manual application of the brakes. The acceleration sensor 12 (FIG. 2) of the leading vehicle 30 detects the sudden deceleration. The transmitter 16 responds to the acceleration sensor 12 and transmits a signal 24A to the rear of the leading vehicle 30. Further, a display 26 may be provided to notify an operator upon the transmission of the signal 24A.

In the repeat warn mode, a trailing vehicle 40 equipped with the present invention is following the leading vehicle 30 as the leading vehicle 30 decelerates as described above. If the trailing vehicle is within a prescribed distance, the receiver 14 located on the front portion of the trailing vehicle 40 receives the signal 24A transmitted by the leading vehicle 30. The brake lights 22B of the trailing vehicle 40 are thereby automatically actuated by the present invention in response to the signal 24A. Importantly, this brake light 22B actuation is accomplished by the collision avoidance system 10 without manual application by the operator of the trailing vehicle 40. Additionally, the signal 24A is retransmitted by the repeater 28 (FIG. 2) and transmitter 16 of the trailing vehicle 40 as signal 24B. The process is then repeated by the collision avoidance system 10 of trailing vehicle 50. This reception, brake light actuation, and retransmission, continues throughout an entire line of vehicles.

In order to prevent a warning signal from being retransmitted down an entire roadway, known techniques such as judicious use of RF power level, and frequency selection in conjunction with certain receiver sensitivities and signal processing, contains the transmitted warning signal within a designated distance. The retransmissions are therefore limited to a predetermined distance.

Optimally, each vehicle would be required to contain such a system similarly to ABS, air bags, etc. However, such complete distribution of the system is not necessary. The system is still capable of receiving a warning signal transmitted from a few vehicle ahead even though the intervening vehicles do not contain the present invention. This is possible due to signal diffraction around unequipped intervening vehicles and to signal energy passing through the cabin of the unequipped intervening vehicles. It should also be recognized that the anti-lock brake system (ABS) could be connected to the collision avoidance system 10, to provide automatic braking capability to the vehicle 20.

By virtue of the rear transmission front reception convention of the present invention, vehicles traveling in the opposite direction, such as on the other side of the roadway, do not receive the warning signal. In other words, vehicles traveling in opposed directions have their receiver patterns facing each other. This provides high transmitter to receiver isolation therefore precluding the false alerting of vehicles in oncoming directions on multi-lane highways.

The present invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A collision avoidance system for a vehicle mounted on the vehicle, comprising:

an acceleration sensor to detect deceleration of the vehicle while the vehicle is traveling on a roadway;

a transmitter for transmitting a warning signal from a rear portion of the vehicle for a specific distance in response to said acceleration sensor detecting deceleration, a receiver for receiving the warning signal from a forward direction, wherein said transmitter, in response to said receiver receiving the warning signal, selectively transmits the warning signal as a retransmission in a manner preventing the warning signal from being transmitted down the entire roadway based on one of the power level and frequency selection techniques in conjunction with receiver sensitivity and signal processing; and an external conventional brake warning light on said rear portion of said vehicle, said brake warning light being actuated when said transmitter transmits said warning signal.

2. The system of claim 1, wherein the warning signal is transmitted as a substantially collimated beam.

3. The system of claim 1, wherein when said transmitter transmits the warning signal for the specific distance in response to said acceleration sensor detecting deceleration, the warning signal has a signal energy and character to pass around a first trailing vehicle and/or to pass through a cabin of the first trailing vehicle to be receivable by a second trailing vehicle within the specific distance.

4. A method of collision avoidance for a leading vehicle and a trailing vehicle traveling on a roadway, the trailing vehicle having an external conventional brake warning light on a rear portion thereof, said method comprising the steps of:

transmitting a warning signal for a specific distance, based on one of the power level and frequency selection techniques in conjunction with receiver sensitivity and signal processing, from a rear portion of the leading vehicle in response to deceleration of the leading vehicle;

receiving the warning signal at the trailing vehicle; and in response to receipt of the warning signal in said receiving step, actuating the brake warning light and selectively transmitting the warning signal from the rear portion of the trailing vehicle as a retransmission in a manner preventing the warning signal from being transmitted down the entire roadway.

5. The method of claim 4, wherein the warning signal is transmitted as a substantially collimated beam.

6. The method of claim 4, wherein when the first-mentioned transmitting step transmits the warning signal from the leading vehicle for the specific distance, the warning signal has a signal energy and character to pass around the trailing vehicle and/or to pass through a cabin of the trailing vehicle to be receivable by a second trailing vehicle within the specific distance.

* * * * *